(12) United States Patent
Weimer et al.

(10) Patent No.: US 9,080,024 B2
(45) Date of Patent: Jul. 14, 2015

(54) HEAT CONTROL SYSTEM FOR CONSOLIDATION ROLLER

(71) Applicant: AIRBUS HELICOPTERS DEUTSCHLAND GMBH, Donauworth (DE)

(72) Inventors: Christian Weimer, Munich (DE); Florian Dorn, Dietramszell (DE); Jens Mack, Kaiserslautern (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 0 days.

(21) Appl. No.: 14/067,021

(22) Filed: Oct. 30, 2013

(65) Prior Publication Data

US 2014/0130985 A1    May 15, 2014

(30) Foreign Application Priority Data

Nov. 9, 2012   (EP) ..................... 12400046

(51) Int. Cl.
| | |
|---|---|
| *B32B 37/00* | (2006.01) |
| *C08J 5/04* | (2006.01) |
| *B29C 70/38* | (2006.01) |
| *B29C 35/16* | (2006.01) |
| *B32B 37/06* | (2006.01) |

(52) U.S. Cl.
CPC . *C08J 5/04* (2013.01); *B29C 35/16* (2013.01); *B29C 70/388* (2013.01); *B32B 37/0053* (2013.01); *B32B 37/06* (2013.01); *B29C 2035/1616* (2013.01); *B29C 2035/1625* (2013.01); *B29C 2035/1633* (2013.01); *B29C 2035/1658* (2013.01)

(58) Field of Classification Search
USPC ............... 156/359, 498, 555, 580, 582, 583.1
See application file for complete search history.

(56) References Cited

U.S. PATENT DOCUMENTS

| | | | | |
|---|---|---|---|---|
| 4,601,775 | A | * | 7/1986 | Grone .......................... 156/523 |
| 5,700,347 | A | | 12/1997 | McCowin |
| 8,191,596 | B2 | | 6/2012 | Hamlyn |
| 2007/0013100 | A1 | | 1/2007 | Capaldo |
| 2008/0093026 | A1 | | 4/2008 | Naumann |

FOREIGN PATENT DOCUMENTS

| | | |
|---|---|---|
| FR | 1555039 A | 1/1969 |
| GB | 1198342 A | 7/1970 |
| WO | 2011006956 A1 | 1/2011 |

OTHER PUBLICATIONS

Search Report and Written Opinion; Application No. EP 12400046; dated Apr. 10, 2013.

* cited by examiner

*Primary Examiner* — James Sells
(74) *Attorney, Agent, or Firm* — Brooks Kushman P.C.

(57) ABSTRACT

A heat control system for an adaptive consolidation roller (8) for the production of consolidated layers (2) made of fiber reinforced polymers comprising the adaptive consolidation roller (8) for applying, on an application surface (3), a band (4) formed of at least one resin pre-impregnated flat tape (5), and a heating system (6, 7) adapted to emit heat radiation directed towards the band (4). Said adaptive consolidation roller (8) is rotatable on a spindle (9) and comprises a surface made of an elastic deformable, flexible material. At least one additional roller (10) with thermal control means is provided and said at least one additional roller (10) is pressed from radial outside against the surface of the adaptive consolidation roller (8).

9 Claims, 1 Drawing Sheet

HEAT CONTROL SYSTEM FOR CONSOLIDATION ROLLER

CROSS REFERENCE TO RELATED APPLICATION

This application claims priority to European patent application No. EP 12 400046.4 filed Nov. 9, 2012, the disclosure of which is incorporated in its entirety by reference herein.

BACKGROUND OF THE INVENTION (1) Field of the Invention

The invention is related to a heat control system for a consolidation roller used for the production of fiber reinforced polymers, in particular to a heat control system for an adaptive consolidation roller used for the production of fiber reinforced polymers using an automatic thermoplastic tape laying process.

The terms fiber reinforced polymers, composite materials or composites are applied with corresponding meanings in this document.

(2) Description of Related Art

Composite materials are particularly attractive to aviation and aerospace applications because of their exceptional strength and stiffness-to-density ratios and superior physical properties. One of the major issues for the future is the manufacturing of the composite parts and the automation of the processes. Automation is seen as an option to reduce costs, increase throughput and reduce scrap in composite part manufacturing. Over the last years, the use of robots has expanded and processes like automated fiber placement (AFP) or Automated Tape Laying (ATL) are of major importance.

The ATL process is a lay-up method for advanced composites. Typically, material is applied via a numerically or robotically controlled head. The head includes a spool or spools of tape or fiber, a winder, winder guides, a compacting roller and some other elements. The head may be located on the end of a multi-axis articulating robot that moves around the tool or mandrel to which material is being applied, or the head may be located on a gantry suspended above the tool. Tape or fiber is applied to the tool in courses, which consist of one row of material of any length at any angle. Multiple courses are usually applied over an area or pattern and are defined and controlled by machine control software.

In the case of thermoplastic composites processing, the fiber reinforced tapes are guided towards a mandrel or mold where the thermoplastic resin will be heated by a hot gas torch or more recently by a laser or other heating devices, e.g. ceramic heaters, hot air gun or infrared heaters. The tape with the molten resin is then consolidated under pressure applied by a consolidation roller and cooled down. Temperature is a very important processing parameter as it influences the thermoplastic behavior, e. g. healing, melting, crystallization and degradation and thus the quality of the resulting composite parts, e. g. presence of voids, their consolidation, process induced stresses and viscoelastic deformation of the material.

Standard consolidation rollers made of metallic materials are well-adapted for flat or semi-flat parts but not for the manufacture of three dimensional parts. Therefore form adaptive consolidations rollers made of metallic and/or polymeric materials, more preferably of elastomer, e.g. natural rubber, e.g. latex derivate or neoprene (polychloroprene) have been developed these last years.

The temperature range in which such elastomer consolidation rollers can be used is comprised between 100° C. and 400° C. It is very important that the temperature at the surface of the consolidation roller remains constant and does not increase during the whole process. As the surface of the consolidation roller is exposed to a heat source, the temperature may increase considerably during the many courses that are necessary to manufacture the composite part. Therefore consolidation rollers are usually tempered using fluid cooling system inside.

Using materials presenting a good thermal conductivity, it is possible to cool down the surface of the consolidation rollers and indirectly the tapes in order to avoid an uncontrolled increase of the temperature at the consolidation roller surface. This system cannot be used anymore for form-adaptive consolidation rollers as their elastomer surfaces are thermal isolators. Thus, it is very important to find a solution to avoid an uncontrolled increase of the temperature at the surface of the consolidation roller.

The document U.S. Pat. No. 5,700,347 A discloses a thermoplastic head for laying down a plurality of thermoplastic resin-impregnated tapes to form a composite. A heating assembly provides high temperature heat on demand and provides cooler gas to avoid heat damage when the head is not laying down tape. Unique compression rollers are able to withstand high temperature operating conditions. An actively cooled post-compression foot with cooling fins cools and consolidates laid down tape. The surface of the compression roller of U.S. Pat. No. 5,700,347 A can be cooled using air while the applied tape is cooled using a second element "a post compression foot" presenting cooling fins.

The document WO/2011/006956 A discloses a machine for applying fibers for making composite materials including a compacting roller for applying a strip consisting of at least one planar fiber pre-impregnated with resin on an application surface and a heating system capable of emitting a thermal radiation toward said strip. The compacting roller comprises a rigid central tube provided with radial holes and a cylinder made of a flexible material, elastically deformable, arranged on said central tube, and having fluid communication means for placing said radial holes in fluid communication with the outer surface of said roller.

The surface of the compacting roller is cooled using a thermal control fluid, preferably a gaseous fluid, particularly air which is brought to the surface via holes in the tubular wall of the central tube of the roller and the use of porous material. Thus the compacting roller of WO/2011/006956 is complicated and therefore expensive as it has to be holed or/and coated. Moreover WO/2011/006956 uses a gas cooling method with an effectiveness limited by the gas/air temperature, by the thermal capacity of the gas/air in relevant cases and by the maximal flux that can be used.

BRIEF SUMMARY OF THE INVENTION

It is an object of the invention to avoid an uncontrolled increase of the temperature at the surface of a consolidation roller for composite materials, particularly of composite materials with a three dimensional surface.

The solution is provided with a heat control system for a consolidation roller for composite materials with the features of claim 1.

According to the invention a heat control system is provided for a preferably form-adaptive consolidation roller for the production of parts made of fiber reinforced polymer materials. A band with a preferably three dimensional surface, e.g. a tape or tow, is applied on an application surface, said band being formed of at least one resin tape or tow, which could be a thermoset or a thermoplastic resin, pre-impregnated flat fiber tape or tow and a heating system is adapted to emit heat radiation directed towards the band.

The heat control system comprises said consolidation roller rotatable on a spindle with a surface made of an elastic deformable, flexible material rendering said consolidation roller adaptive to said band formed of at least one resin pre-impregnated flat fiber tape. The heat control system is further provided with at least one additional roller with thermal control means and said at least one additional roller is pressed from radial outside against the surface of the adaptive consolidation roller. The at least one additional roller forms a contact surface with the adaptive consolidation roller for improved thermal exchanges between the e. g. hot form-adaptive consolidation roller and the at least one e. g. cold additional roller for effective cooling of the hot form-adaptive consolidation roller.

The number of additional rollers can be adjusted to reach the objective of an e. g. constant temperature at the surface of the consolidation roller. The invention concerns form-adaptive consolidation rollers, which are preferably made of elastomer with a low thermal conductivity. The cooling of the consolidation roller surface through thermal exchanges at the contact surface using an additional cooled roller according to the inventive heat control system is more effective than an internal cooling system that would have to transfer the heat across the thickness of a surface of the consolidation roller with low thermal conductivity.

The heat removal of the inventive heat control system happens directly at the concerned surface and profits of the high thermal conductivity of the at least one additional roller. The inventive heat control system allows in-situ consolidation, i.e. in-situ fiber placed high performance thermoplastic composites. The inventive heat control system allows the use of dry or pre-impregnated tows with a thermoplastic content of 5-20% by weight by keeping the temperature field homogenous and the nip-point temperature constant in order to assure a constant format and rheology of the toughener in laminate.

According to a further preferred embodiment of the invention the thermal control means are cooling fluids adapted to the process and the required temperature. Moreover the cooling fluids can also be at negative temperatures.

According to a further preferred embodiment of the invention the at least one additional roller is made in usual metallic materials.

According to a further preferred embodiment of the invention the number of additional rollers can be adjusted in order to ensure a constant temperature comprised between 100° C. and 400° C. at the surface of the form-adaptive consolidation roller.

BRIEF DESCRIPTION OF THE SEVERAL VIEWS OF THE DRAWINGS

Preferred embodiments of the invention are presented in the following description with reference to the attached drawings.

DETAILED DESCRIPTION OF THE INVENTION

Figure 1:
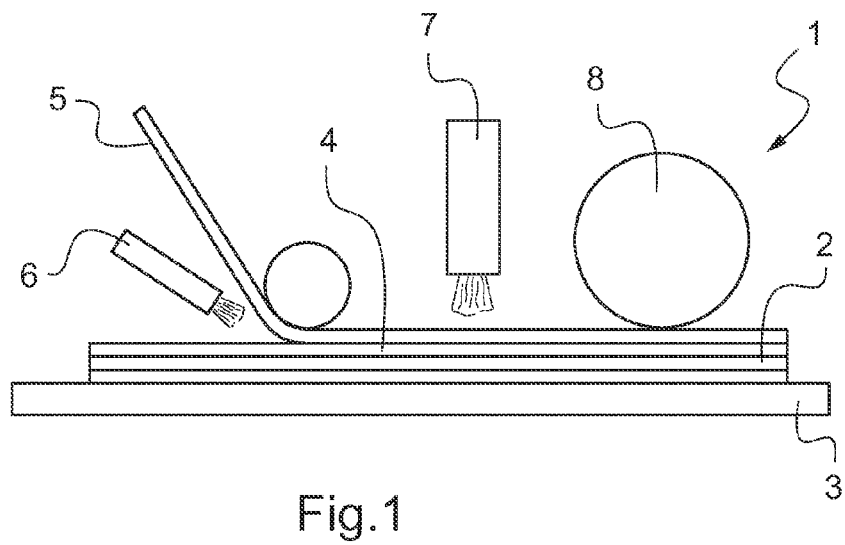
FIG. 1 shows a schematic process lay up for automated tape laying.

According to FIG. 1 a production line 1 for composite parts (fiber reinforced plastics) made of consolidated layers 2 comprises an application surface 3, a band 4 formed of thermoset or thermoplastic resin pre-impregnated tapes or tows 5, and a heating system with a preheater 6 and a main heater 7 adapted to emit heat radiation directed towards the band 4.

An adaptive consolidation roller 8 with a surface made of an elastic deformable, flexible material is rotatable on the band 4. The band 4 of bounded tapes or tows 5 with a thermoplastic content between 5 and 50% are pre-impregnated slit tapes or/and direct tows 5 with a high melting temperature of 150-400° C.

The heating system 6, 7 is mounted upstream of the adaptive consolidation roller 8 with regard to the progress direction of the application of tapes or tows 5 on the application surface 3. The heating system 6, 7 may be directed towards the tapes or tows 5 deposited beforehand.

Figure 2:
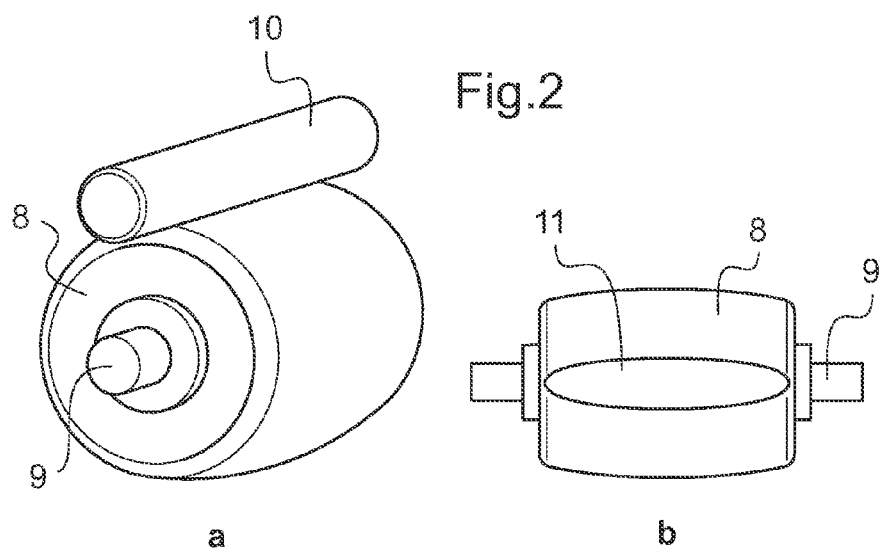
FIG. 2a shows a perspective view of a heat control system for a consolidation roller according to the invention.
FIG. 2b shows a top view of the adaptive consolidation roller according to the invention.

According to FIG. 2a corresponding features are referred to with the references of FIG. 1. The adaptive consolidation roller 8 of a heat control system is rotationally mounted about a spindle 9 on a support material at the end of a robot (not shown). The adaptive consolidation roller 8 is in contact on the band 4 of tapes or tows 5 on the application surface 3. The adaptive consolidation roller 8 is moved by the robot.

The adaptive consolidation roller 8 has a rotationally symmetric body with a surface made of a flexible material, preferably elastomer. The surface of the adaptive consolidation roller 8 is elastically deformable by compression. This flexible, rotationally symmetric surface allows the consolidation roller 8 to adapt to the band 4 of tapes or tows 5 following curvature variations of the application surface 3.

An additional roller 10 of the heat control system is pressed into contact with the surface of the adaptive consolidation roller 8. The additional roller 10 comprises thermal control means (not shown) to realize a constant nip-point temperature at the surface of the adaptive consolidation roller 8 to prevent warp and intrinsic stresses in the final consolidated layers 2. The thermal control means comprises a fluid at room temperature of 20-30° C. or at a temperature lower than 20° C., even at a temperature lower than 0° C. The fluid is a gas or a liquid, for example water, cooling oil, alcohol or a glycol.

The number of additional rollers 10 can be adjusted in order to ensure a constant temperature comprised between 100° C. and 400° C. at the surface of the consolidation roller 8.

According to FIG. 2b the contact surface 11 of the additional roller 10 pressed into contact with the surface of the adaptive consolidation roller 8 has an essentially oval shape parallel along their respective rotational axis.

REFERENCE LIST 1 production line
2 consolidated layers
3 application surface
4 band
5 pre-impregnated flat tape or tow
6 preheater
7 main heater
8 consolidation roller
9 spindle
10 additional roller
11 contact surface

What is claimed is:

1. A heat control system for a consolidation roller for producing fiber reinforced polymers made of consolidated layers from a band of at least one resin pre-impregnated flat tape or tow of composite materials formed by a heating system adapted to emit heat radiation directed towards the band on an application surface, the system comprising the consolidation roller and a spindle, the consolidation roller being rotatable on the spindle and comprising a surface made of an elastic deformable, flexible material, wherein at least one additional roller with thermal control means is provided and the at least one additional roller is pressed from outside against the surface of the consolidation roller, the at least one additional roller having a contact surface defined by a contact region between the at least one additional roller and the surface of the consolidation roller, the contact surface having a generally oval shape.

2. The heat control system according to claim 1, wherein the thermal control means are cooling fluids.

3. The heat control system according to claim 1, wherein at least one of the at least one additional roller is made of metallic materials.

4. The heat control system according to claim 1, wherein the consolidation roller is made of an elastomer, at least at the surface.

5. The heat control system according to claim 1, wherein the at least one additional roller ensures a constant temperature between 100° C. and 400° C. at the surface of the consolidation roller.

6. The heat control system of claim 1, wherein the at least one additional roller comprises a plurality of additional rollers, and wherein the plurality of additional rollers maintains a temperature between 100° C. and 400° C. at the surface of the consolidation roller.

7. A system for manufacturing a composite material, the system comprising:
    a head configured to lay composite resin pre-impregnated tapes or tows in layers;
    a consolidation roller rotatable about a first axis of rotation and configured to apply pressure to tapes or tows laid by the head, the consolidation roller having an elastic outer surface;
    a cooler roller having an internal cooler and being rotatable about a second axis of rotation, the second axis of rotation being spaced from the first axis of rotation such that the cooler roller contacts the elastic outer surface; and
    at least one additional cooler roller, wherein the number of cooler rollers is adjustable to maintain a temperature between 100° C. and 400° C. at the elastic outer surface.

8. The system of claim 7, wherein the internal cooler comprises an interior chamber and a cooling fluid disposed within the interior chamber.

9. The system of claim 7, wherein the elastic outer surface comprises an elastomeric material.

* * * * *